United States Patent Office

2,828,297
Patented Mar. 25, 1958

2,828,297

PROCESS FOR THE RECOVERY OF LIGNIN FROM BLACK LIQUORS

Johann Giesen, Haldenstein, near Chur, Switzerland, assignor to Inventa A.-G., für Forschung und Patentverwertung Luzern, Lucerne, Switzerland No Drawing. Application October 19, 1954
Serial No. 463,307

Claims priority, application Switzerland
November 19, 1953

3 Claims. (Cl. 260—124)

The present invention relates to a process for recovering lignin from black liquors.

The precipitation of lignin from the alkaline lye-washes of sulphate cellulose manufacture, called black liquors, by introduction of carbon dioxide under normal pressure and at room or elevated temperature is known. From the investigations of Holmberg and Wintzell, Rep. 54, 2417 (1921), it follows that lignin can be separated from black liquor by addition of mineral or organic acids practically quantitatively, but on the other hand the precipitation by introduction of carbon dioxide remains incomplete. A further disadvantage is the poor filterability of the separated lignin because of its fine division, which cannot be improved sufficiently even by heating of the liquor during the introduction to 75° C. By addition of common salt, the lignin, as the above-mentioned authors report, can be converted into coarse-grained form. However, the presence of common salt in the liquir freed from lignin would have a disturbing effect on the recovery of the original sodium salts and therefore it is extremely undesirable.

In U. S. Patent 1,303,176, there is described a process for obtaining lignin by pressure heating of sulphite lye-washes and black liquors, wherein by subsequent introduction of carbon dioxide under a pressure of about 50 pounds per square inch the separation of the lignin is accomplished. This treatment goes on discontinuously or by a batch process in pressure vessels with stirring. In contradistinction thereto, the present process relates to a continuous treatment of the black liquor.

It has been found that the lignin of black liquors can be obtained to all intents and purposes fully and in thoroughly separable form if the lignin is precipitated at elevated temperature, preferably about 100°–120° C., with carbon dioxide under pressure, preferably about 20 atmospheres, continuously. In this procedure, the carbonation of the black liquor is carried out in two stages, and in such a way that in the first stage, the liquor is at first saturated at substantially ordinary room temperature continuously with carbon dioxide under pressure and in the second stage immediately ensuing, it is heated continuously under the same carbon dioxide pressure. Furthermore, it is necessary that the carbonation should take place with circulation of liquid in such a way, that the fresh black liquor to be converted should be fed continuously to the already carbonated liquor that is found in circulation. Under these conditions, the lignin becomes separated practically completely and in a way lending itself to thorough filtration.

The process described is executed, for example, in such manner, that the black liquor is permitted to flow in direct current with the carbon dioxide introduced simultaneously under a pressure of about 20 atmospheres from below upward through a vertical tube or chamber in the lower zone of which the first stage of the carbonation comes about at ordinary room temperature, whereas in the upper heated zone, the further conversion takes place at about 100°–120° C. (second stage). The liquor emerging together with the carbon dioxide at the upper end of the tube, which contains the separated lignin suspended, is cooled, is collected in a separator and is conducted back into the liquid circulation after removal of a partial quantity. The escaping carbon dioxide likewise gets back into the circulation of gas and in this procedure, the pressure of about 20 atmospheres is maintained by addition of fresh carbon dioxide.

The carbonation of the black liquor can also be conducted in two tubes connected in series in a way, whereby carbonating is done at normal temperature in the first tube and hot in the second tube and for the rest procedure is had as described. Furthermore in analogous manner also liquor and carbon dioxide can be allowed to react with each other in two towers in counter-current.

The caustic soda contained in the black liquor is converted into carbonate or bicarbonate by the treatment with carbon dioxide. Thus after separation of the precipitated lignin, there is obtained a liquor containing sodium-carbonate or bicarbonate from which in known manner, the caustic soda is able to be recovered for wood decomposition by inspissation, combustion and caustification.

The process is elucidated in the light of an example but is not limited to it.

*Example*

Through a reaction tube vertically arranged and having a capacity of 2.1 liters, 4.5 liters of black liquor of specific gravity of 1.100 and with a content of lignin of 4.8%, is pumped and circulated therethrough. At the same time, by means of a gas circulation pump, 12 cubic meters per hour of carbon dioxide (measured at normal atmospheric pressure) is introduced under a pressure of 20 atmospheres into the direct current with the liquor. The liquor saturated at first under normal or room temperature conditions in the first stage runs through the second stage in the upper part of the tube which is at 100°–120° C. and after cooling is collected in a separator. Here about 1.5 liters per hour of carbonated liquor is drawn off together with the separated lignin and the remainder after the addition of fresh black liquor is recirculated through the system. In 80 hours, 116 liters of carbonated liquor is obtained containing the lignin as a brown suspension. The separation of the lignin is accomplished in known manner by filtration or centrifugation. After washing out and drying, there is obtained 5.8 kg. of lignin, corresponding to 4.5% of the black liquor employed.

While the invention has been described with particular reference to a specific example, it is to be understood that it is not to be limited thereto, but is to be construed broadly and restricted solely by the scope of the appended claims.

What is claimed is:

1. The process of recovering lignin from black liquor, which comprises continuously advancing the black liquor through a circulating system while subjecting the advancing liquor to carbon dioxide in two successive stages, in the first stage the black liquor being saturated with carbon dioxide at a temperature of about 10°–30° C. and under pressure and in the second stage the black liquor being treated with carbon dioxide at a temperature of about 100° to 120° C. and under pressure, to precipitate out the lignin from the black liquor.

2. The process of recovering lignin from black liquor, which comprises continuously advancing the black liquor through a circulating system while subjecting the advancing liquor to carbon dioxide in two successive stages, in the first stage the black liquor being saturated with carbon dioxide at a temperature of about 10°–30° C. and under pressure of about 20 atmospheres and in the second stage the black liquor being treated with carbon dioxide at a temperature of about 100° to 120° C. and under pressure of about 20 atmospheres, to precipitate out the lignin from the black liquor.

3. The process of recovering lignin from black liquor, which comprises continuously advancing the black liquor through the circulating system while subjecting the advancing liquor to carbon dioxide in two successive stages, in the first stage the black liquor being saturated with carbon dioxide at a temperature of about 10°–30° C. and under pressure, and in the second stage the black liquor being treated with carbon dioxide at a temperature of about 100–120° C. and under pressure, to precipitate out the lignin from the black liquor, cooling the carbonated black liquor containing the lignin precipitate, collecting the carbonated black liquor in a receptacle, drawing off a part of the carbonated black liquor with the precipitated lignin from the receptacle to separate the precipitated lignin therefrom, adding fresh black liquor to the remaining carbonated black liquor and recirculating the resulting mixture through the system.

References Cited in the file of this patent

UNITED STATES PATENTS

| | | |
|---|---|---|
| 1,303,176 | Drewson | May 6, 1919 |
| 2,228,976 | Reboulet | Jan. 4, 1941 |
| 2,406,867 | Tomlinson, et al. | Sept. 3, 1946 |